US012768650B2

(12) United States Patent
Rogers

(10) Patent No.: US 12,768,650 B2
(45) Date of Patent: Oct. 20, 2026

(54) UTILITY POLE GUY WIRE ANCHOR POINT LOCATING DEVICE

(71) Applicant: Ron Rogers Mfg. Inc., Trenton (CA)

(72) Inventor: Ronald Rogers, Ontario (CA)

(73) Assignee: Ron Rogers Mfg. Inc., Trenton (CA)

( * ) Notice: Subject to any disclaimer, the term of this patent is extended or adjusted under 35 U.S.C. 154(b) by 356 days.

(21) Appl. No.: 18/647,933

(22) Filed: Apr. 26, 2024

(65) Prior Publication Data

US 2024/0384989 A1 Nov. 21, 2024

Related U.S. Application Data

(60) Provisional application No. 63/462,715, filed on Apr. 28, 2023.

(51) Int. Cl.
*G01C 15/00* (2006.01)
*G01B 3/56* (2006.01)

(52) U.S. Cl.
CPC ............. *G01C 15/004* (2013.01); *G01B 3/56* (2013.01)

(58) Field of Classification Search
CPC ................................ G01B 3/56; G01C 15/004
USPC .................................. 33/1 G, 1 N, 228, 534
See application file for complete search history.

(56) References Cited

U.S. PATENT DOCUMENTS 1,393,891 A * 10/1921 Hansen .................... G01B 3/56 33/285
1,640,435 A * 8/1927 Armstrong ............... G01C 1/00 33/277
2,103,332 A 12/1937 Mayfield
2,330,414 A 9/1943 Elwert
3,790,277 A * 2/1974 Hogan ..................... G01C 5/00 356/141.2
4,247,225 A * 1/1981 Chickini, Jr. ....... E21D 21/0093 24/484
4,736,524 A * 4/1988 King ........................ G01B 3/56 33/469
5,125,164 A * 6/1992 Fournier ................ G01B 11/27 33/608
5,368,112 A * 11/1994 Mount ...................... E21B 7/02 175/122

(Continued)

FOREIGN PATENT DOCUMENTS

JP 2012026832 A * 2/2012

OTHER PUBLICATIONS

LaserTech T & D Pro Software https://paragoninstruments.com/surveying-and-construction/lasertech-t-d-pro-software/ (Accessed May 31, 2023).

(Continued)

*Primary Examiner* — George B Bennett
(74) *Attorney, Agent, or Firm* — Polson Intellectual Property Law, PC; Margaret Polson

(57) ABSTRACT

The present application provides a utility pole guy wire anchor point locating device, and method of using said device, for determining the anchor point location of a guy wire used on a utility pole that is part of a curved section of transmission pole line. The device may be used for assisting utility transmission line personnel in locating the directional bearing for positioning the anchor point at a desired distance form a utility pole without angle measure or bisection calculation, particularly on a curved section of a transmission line.

16 Claims, 19 Drawing Sheets

(56) References Cited

U.S. PATENT DOCUMENTS

| | | | | |
|---|---|---|---|---|
| 5,488,777 | A * | 2/1996 | Erdesky | G01C 1/00 33/285 |
| 5,819,426 | A * | 10/1998 | Virtanen | G09B 29/10 33/1 G |
| 6,763,595 | B1 | 7/2004 | Hersey | |
| 7,478,563 | B2 * | 1/2009 | Weisman | G01L 5/042 73/833 |
| 9,103,090 | B2 * | 8/2015 | Bushore | E02D 27/42 |
| 9,637,139 | B2 * | 5/2017 | Kathan | B61B 11/00 |
| 10,348,068 | B2 * | 7/2019 | Nureddine | H02G 1/02 |
| 10,969,223 | B2 * | 4/2021 | Miller | G01C 15/00 |
| 10,994,569 | B2 * | 5/2021 | Rosenfield | G01B 1/00 |
| 11,879,732 | B2 * | 1/2024 | Gold | G01C 11/04 |
| 12,569,977 | B1 * | 3/2026 | Gonzalez | B25H 7/005 |
| 2016/0222689 | A1 * | 8/2016 | Ben Horin | E04H 12/20 |
| 2019/0177995 | A1 * | 6/2019 | Klause | E02D 27/425 |
| 2025/0260151 | A1 * | 8/2025 | Toland | H01Q 1/16 |

OTHER PUBLICATIONS

T & D Pro Software Solution Brochure https://paragoninstruments.com/wp-content/uploads/2021/05/T-and-D-Pro-Software-Specifications-Brochure1.pdf (Accessed May 31, 2023).

How to Use a C Pull Finder, No Matter the Type of Guy Wire http://gmpemployees.com/blog/2016/05/how-to-use-a-c-pull-finder-No. matter-the-type-of-guy-wire/ (Accessed May 25, 2023).

* cited by examiner 1
10
12
18c
20
26
30
33a
33b
34
36
38
60
G3

UTILITY POLE GUY WIRE ANCHOR POINT LOCATING DEVICE

CROSS-REFERENCE TO RELATED APPLICATIONS

The present application claims priority to U.S. Provisional patent application 63/462,715, filed Apr. 28, 2023, the contents of which are hereby incorporated by reference in their entirety.

FIELD

The present application generally relates to guy wires for utility poles. More particularly, the present application relates to an anchor point locating device for determining the anchor point of a guy wire for supporting a utility pole, particularly on a curved section of transmission pole line. The device may be used for assisting utility transmission line personnel in locating the anchor point without angle measure or bisection calculation.

BACKGROUND

A utility pole is a column or post for supporting overhead power lines and various other public utilities and related equipment. These poles are typically spaced along a tract, with sections of wire in different forms depending on their use, including sections which generally have straight sections of the line, and sections which generally have curved sections of the line.

Poles on the curved section are generally subjected to different forces than are those on a straight section. Their conductors (due to deviation from a straight run) exert a force tending to pull the poles inward toward the centre of the curve of that section of line. This force must be countered by a guy cable anchored on the outside of the curve. Ideally, this location is exactly, or very close to, 180 degrees from the bisector of the angle formed by two adjacent poles before and after the middle pole whose guy anchor point is to be located.

Existing methods of calculating this location include using a protractor or the like, which measures the included angle formed by the three poles. A technician would then bisect that angle and extend the bisector back 180 degrees, toward the outside of the line curve where the guy is anchored, thus countering the tendency for the pole to be pulled toward the curve centre. This can be a difficult and awkward method, as it requires several personnel to determine the angle, to bisect it and, most importantly, to try to accurately sight in to the needed guy anchor point location, such as shown in U.S. Pat. No. 2,330,414 to Elwert. Other techniques determine the length of the "pull" inward (see U.S. Pat. No. 1,640,435 to Armstrong), which may be of little interest when determining the position of a proper anchor point. Other devices require attachment to a utility pole for determining the required angles, which is not helpful with more modern metallic-based poles. These are often difficult to work with and particularly unsuitable in uneven terrain or difficult environmental conditions, such as in the winter where snow can ice can be treacherous to the technicians in the field. Further, some existing computer systems are expensive and complicated to work with. Thus, there has long existed a need to more easily and accurately determine the bearing toward the position of a guy wire anchor point, particularly on a curved section of a transmission line.

This background information is provided for making information available believed by the applicant to be of possible relevance to the present application. No admission is necessarily intended, nor should be construed, that any of the preceding information constitutes prior art against the subject matter presented herein.

SUMMARY

An aspect of the present application is to provide a device and method for determining a location for positioning a guy wire anchor for supporting a utility pole.

In accordance with one aspect, there is provided a utility pole guy wire anchor point locating device comprising a plurality of arms, such as three arms, and a focused light source, such as a laser, to determine the bearings for locating the position for optimal placement of a guy wire anchor for supporting a utility pole on a curve between two or more adjacent utility poles. The laser is used to project light away from the device onto a surface outside a curved section of a utility pole transmission line between a first utility pole (typically on the left) and a second utility pole (typically on the right). The device is positioned at a location between the first and second utility poles to be sighted, at or near a utility pole (e.g. a "middle" pole) or surveyor's mark on the curved transmission line between the two utility poles to be sighted. In one embodiment, the light from the laser projects onto a surface to indicate the correct bearing. In one embodiment, the light may be a vertical line (either alone or as a component of a cross-hair laser beam) from the device which, when viewed against a backdrop vertical surface or against the ground directly, intersects with the ground. The light from the laser provides bearings which is used to identify an optimal direction to facilitate the location for positioning the guy wire anchor in the surrounding terrain. A method of using said device for determining a guy wire anchor location point is also provided.

Advantageously, the present measuring device and method allow for a one-person operation, whereby a technician can set up the device adjacent to, on, or in the surveyed location of a centre pole of a 3-pole section of the curved line. Thus, the need for a second technician may be eliminated, as the device itself provides the determined bearing for positioning the guy wire anchor. In one embodiment, a technician may simply set up the device at or near the middle utility pole or location in question, sight each of the first utility pole (such as a left hand pole, LH) using a first arm of the device, then a second utility pole (such as a right hand pole, RH) using a second arm of the device, set the third arm of the device on the scale number on the device, activate the laser and walk to a location at a pre-determined distance from the device. The location can be sighted using the vertical component of the laser light either directly on the ground, or by holding up any flat vertical surface (non-limiting examples include a sheet of cardboard or other flat material, including the technician's own torso) in the path of the final position of the laser beam which comprises a vertical laser beam component that intersects with a point on the ground. In either scenario, this provides directional bearings to identify a point on the ground where the anchor point is thus determined.

BRIEF DESCRIPTION OF THE DRAWINGS

FIG. 2 illustrate separated components of one embodiment of the anchor point locating device.

FIG. 3 show various views of one embodiment of the anchor point locating device.

DETAILED DESCRIPTION

Provided herein is a utility pole guy wire anchor point locating device and method of use thereof. In one embodiment, the device comprises a plurality of "arms", typically two or more arms, more typically three arms. The arms are used as directional aids for sighting towards two utility poles to be sighted, each on either side ("left" and "right") of a location on a curved section of a utility pole transmission line (such as at or near a middle utility pole generally between the two utility poles to be sighted), and for directional bearing locating using a focused light source (such as a laser), for determining an optimal location for placement of the guy cable/wire anchor on the outside of the utility pole transmission line curve. As used herein, a "middle pole" or "middle utility pole" is located generally equidistant between the first (left hand) and second (right hand) utility poles to be sighted on the curved section of the utility pole transmission line connecting the three (left, middle, right) utility poles.

In one embodiment, the device is used for determining the location for placement of the guy anchor using three poles in a transmission line, where the middle pole (i.e., a pole on a curved section) is to be anchored by the guy wire attached to the guy anchor. The middle pole may or may not yet have been placed; if not, its intended position may be established with a surveyor's mark or a temporary pole. The guy wire is typically used for supporting the middle pole which may be subjected to excessive strain from the weight of the transmission wires to be supported. Typically, on a long, curved utility pole transmission line, there may be several poles (though not necessarily all) requiring a guy wire support. Where and whether a guy is required is usually determined by an engineer or field technical personnel on a case by case basis, often depending on making allowances for adjacent property access, fence lines, trees and any number of possible obstacles outside the line curve.

To gain a better understanding of the device described herein, the following examples are set forth. These examples are for illustrative purposes only, and they should not limit the scope of the present application in any way.

Figure 1:
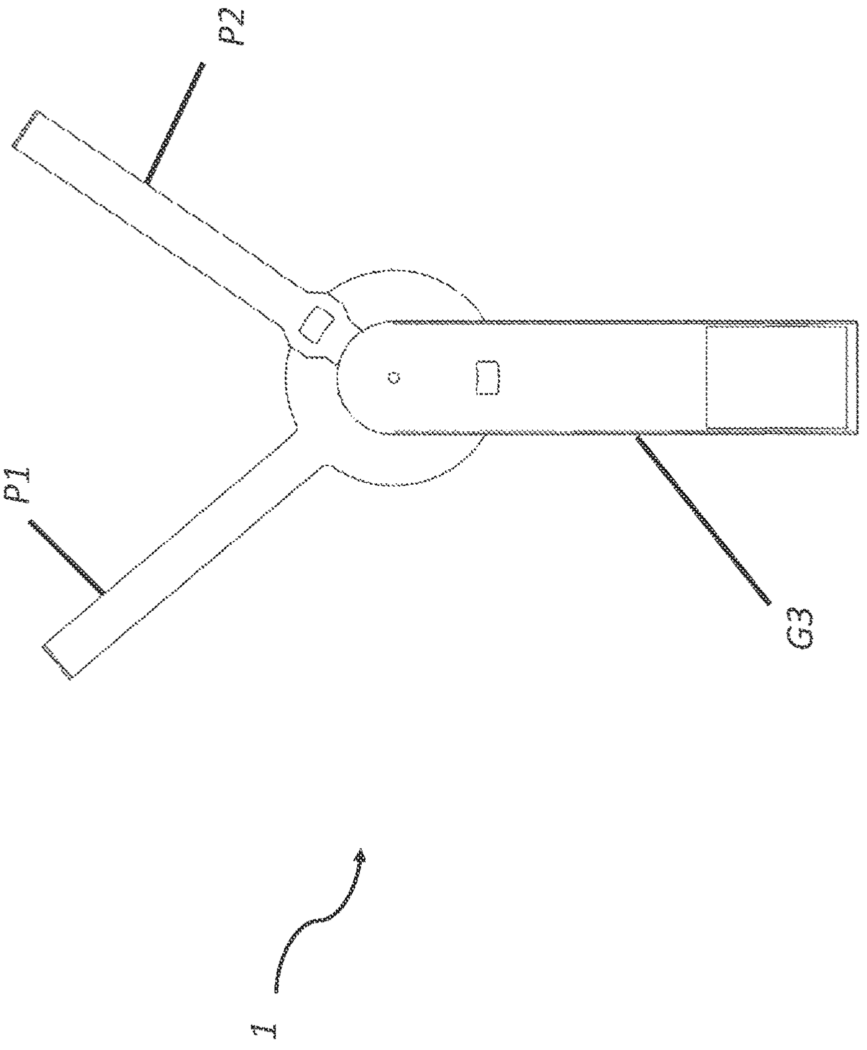
FIG. 1 illustrates one embodiment of a utility pole guy anchor point locating device as described herein (without scales indicated).

An embodiment of the present measuring device 1 is shown generally in FIG. 1, as well as in FIGS. 9, 11, 12, 13A and 13B. In this embodiment, the device comprises two pointing arms, P1 and P2, connected with each other and to a third arm, guy arm G3. The three arms are generally long planar members of a durable material, such as stainless steel (e.g. 304 stainless steel, 0.060") as one example, or other suitable material. Ideally, the arms (and, indeed, the entirety of the device) should be relatively lightweight and easy to handle by a single person.

Figures 2A, 2B, 2C:
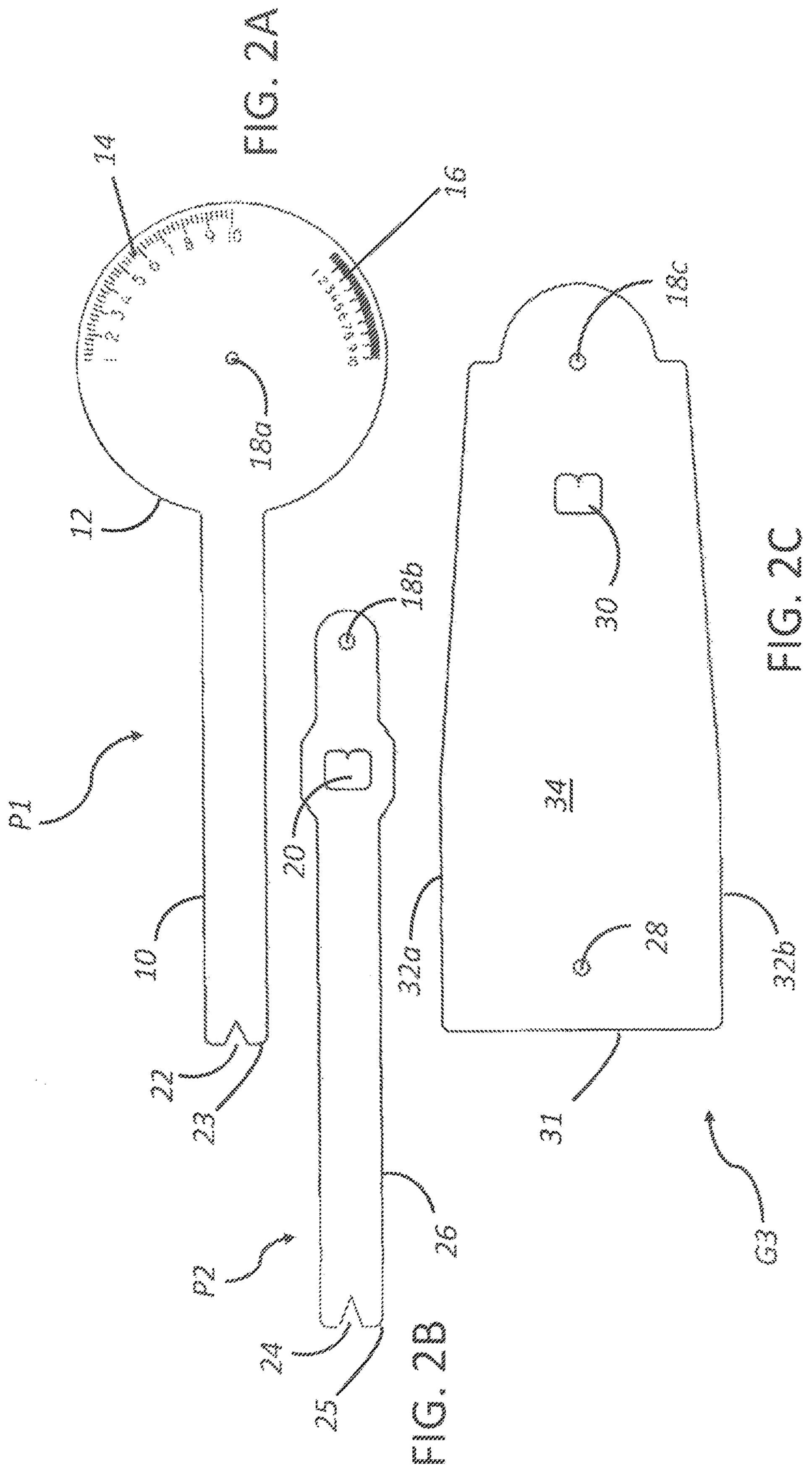
FIG. 2A shows a first arm.
FIG. 2B shows a second arm and FIG. 2C shows a guy arm (prior to flanging for mounting with a laser beam generator).
Figure 15:
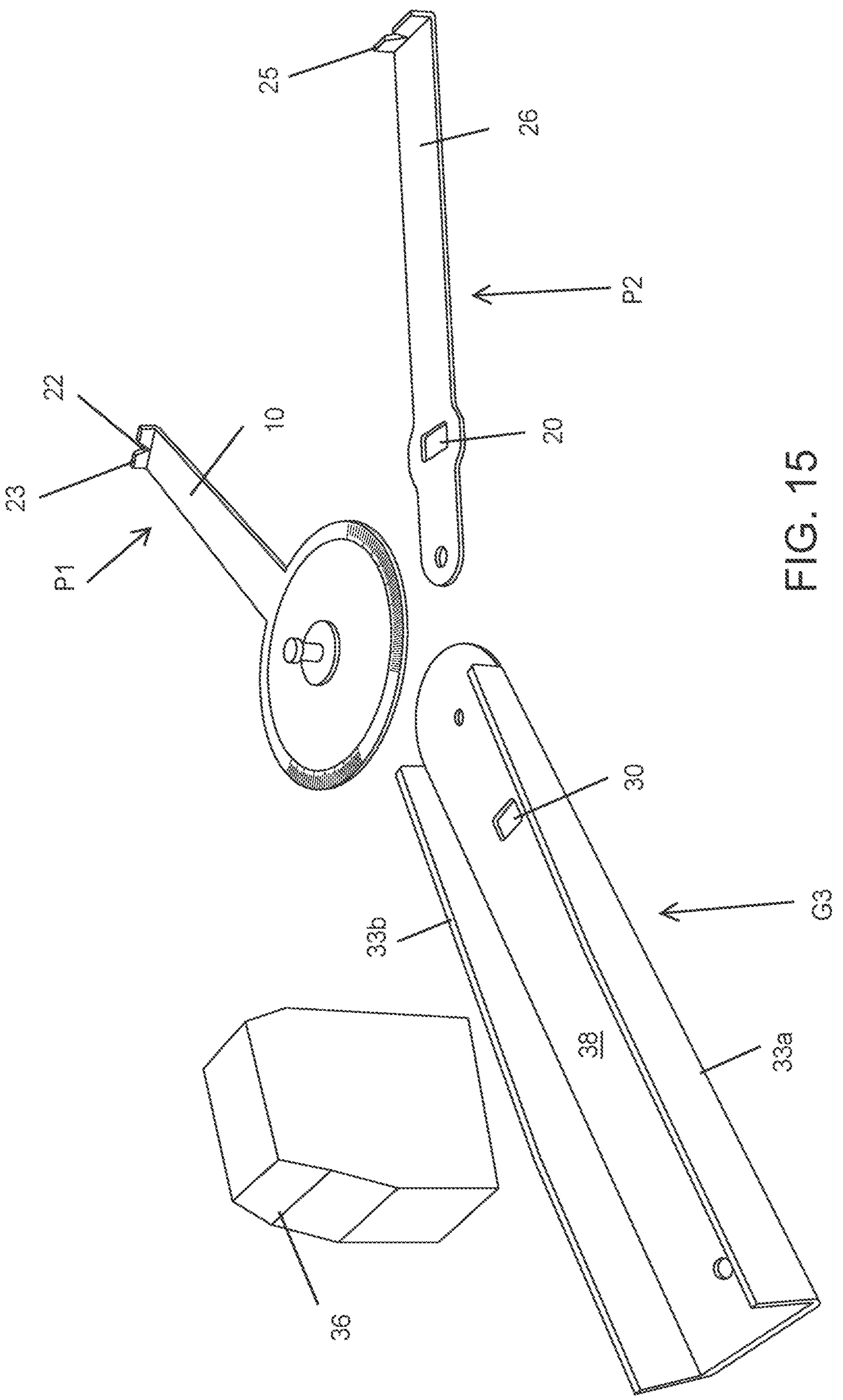
FIG. 15 shows an exploded view of one embodiment of the present device.

FIGS. 2A-C illustrate one disassembled embodiment of the device, also illustrated in FIG. 15. In FIG. 2A, arm P1 comprises a pointer body 10 and a measuring disc 12. The pointer body 10 extends a distance away from the measuring disc 12 to provide a directional pointing guide means for pointing to one (typically the left) of the adjacent utility poles to be sighted. For these purposes, an arm length of about 10 inches from measuring disc centre hole 18*a* to an end 23 of the arm would be ideal, but arms of different lengths may be used as desired. At an end of the pointer body opposite the measuring disc, an inset 22 may be provided (such as a V-shaped groove or notch as shown). In one embodiment, the insets (22 and 24) on arms P1 and P2, respectively, are turned up at approximately 90 degrees during instrument construction to facilitate their use as part of the sighting to the two adjacent poles. These insets may be used to aid the user when viewing the adjacent pole along the sightline of the pointer body. For example, an adjacent pole can be visualized within the inset when "lining up" the pointer body with the pole.

Figure 7:
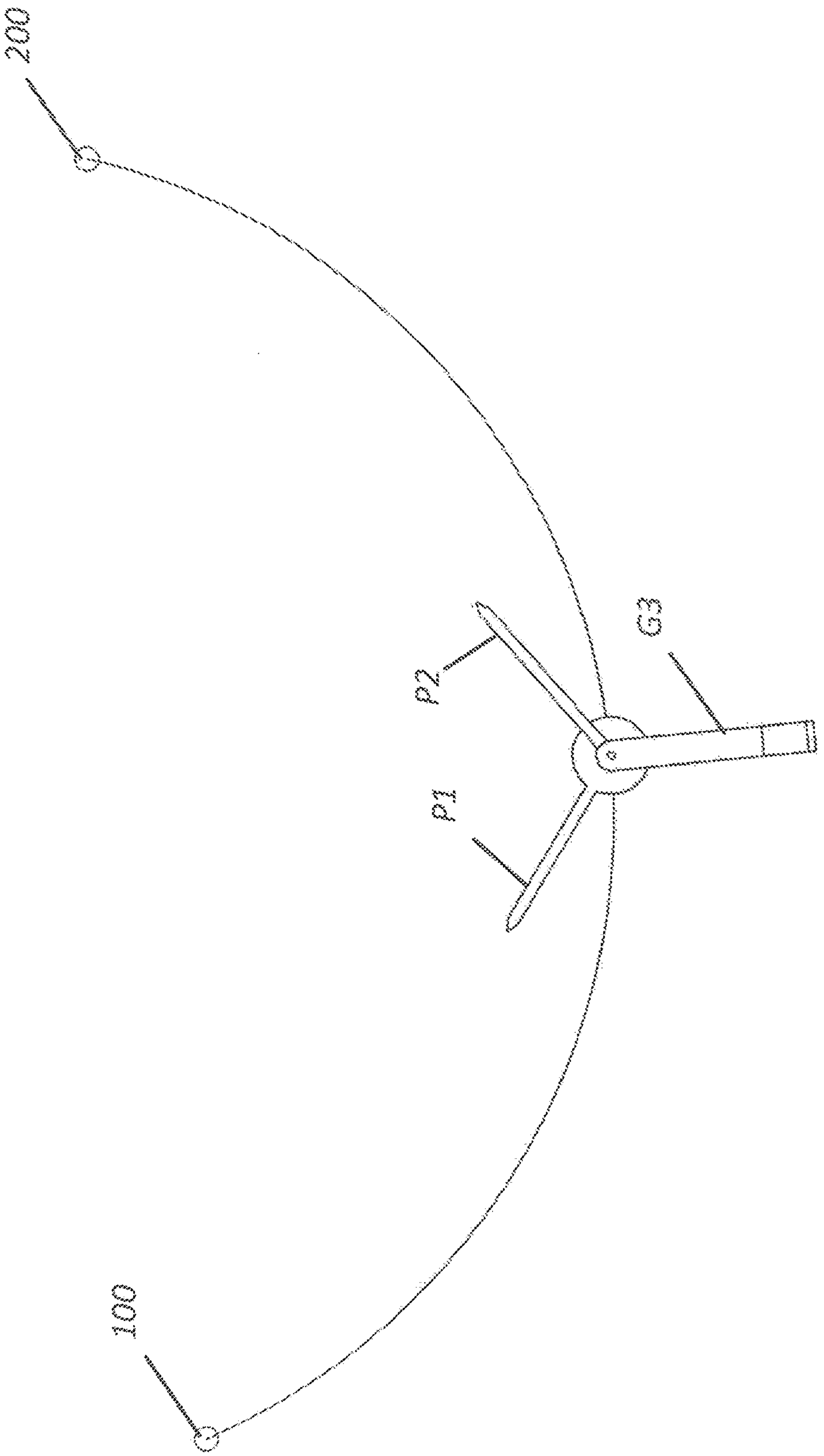
FIGS. 7 and 8 show one embodiment of the anchor point locating device in use between two adjacent utility poles, illustrating a final position of arm G3 toward an anchor point outside the line curve.
Figure 8:
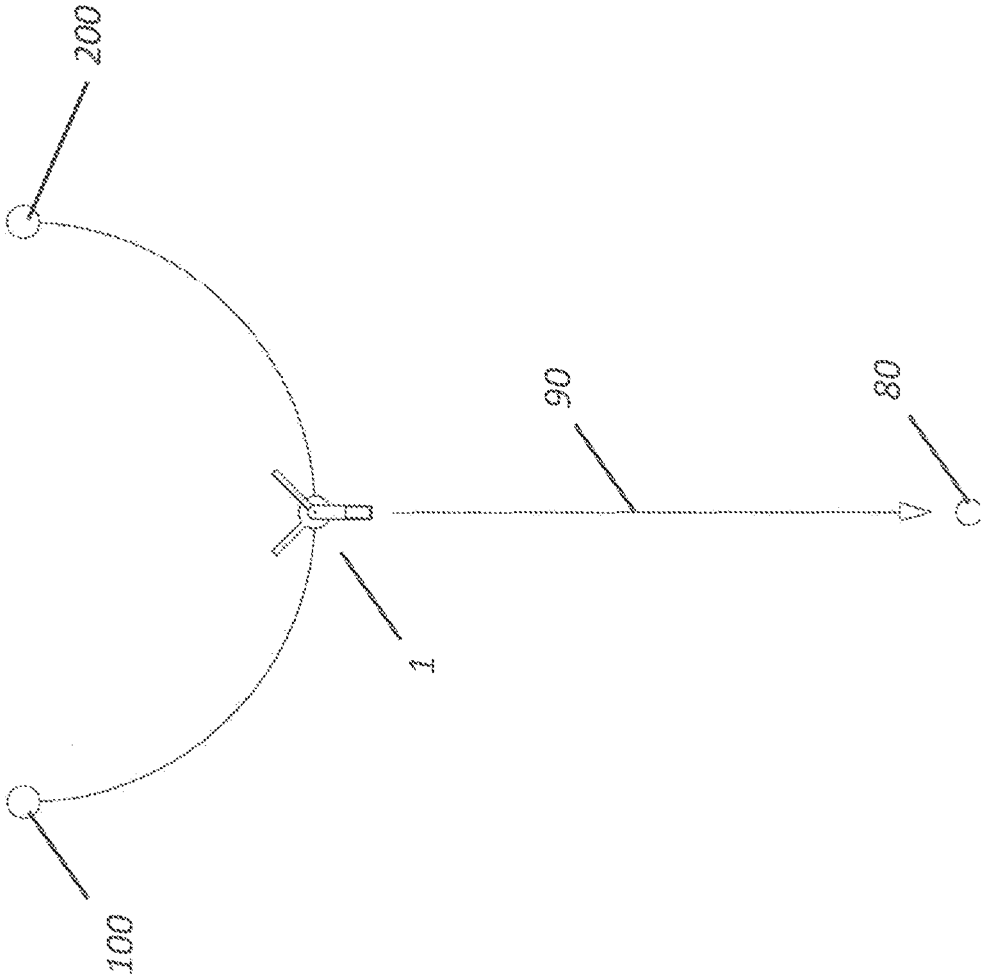
Figure 9:
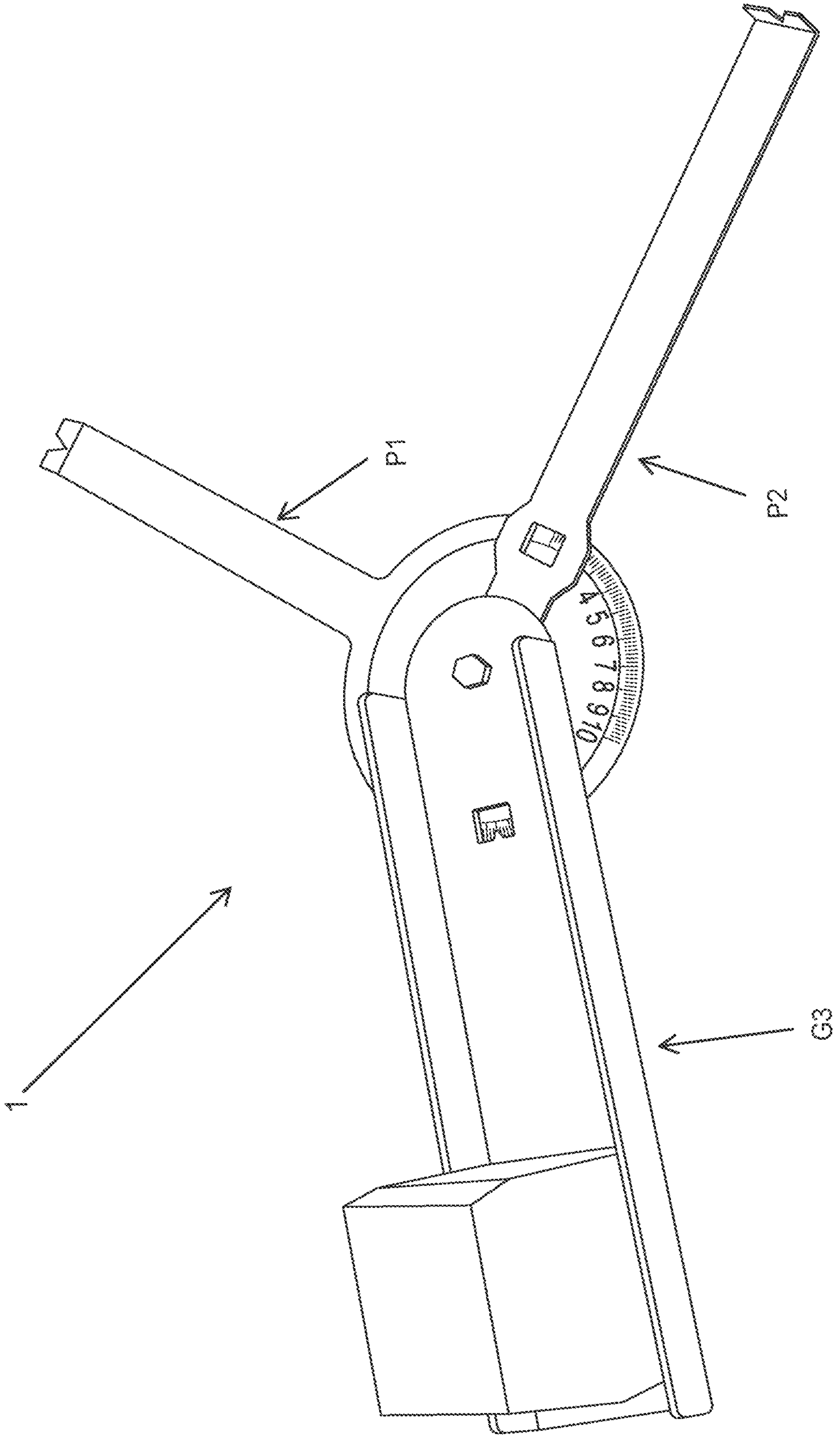
FIG. 9 shows an embodiment of the device with the arms extended.
Figure 14:
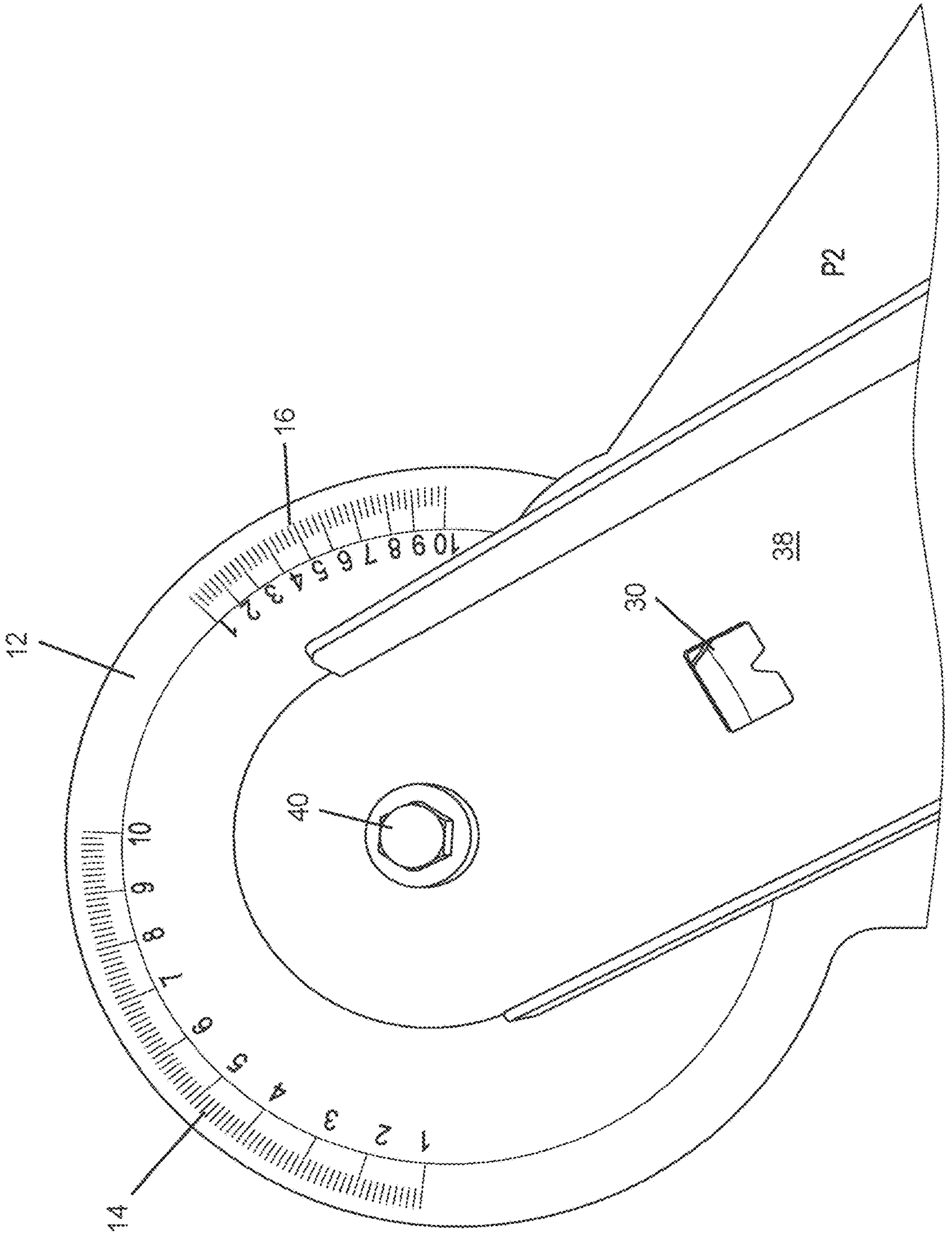
FIG. 14 shows a close up view of a measuring disc on one embodiment of the present device.

The measuring disc 12 comprises two or more scales or headings, typically two scales. In one embodiment shown in FIG. 2A, measuring disc 12 comprises a first scale 14 (graduated 1-10), and a second scale 16 (also graduated 1-10). The first scale 14 may be used for indicating a bearing of left adjacent pole 100 relative to right adjacent pole 200, such as schematically illustrated in FIGS. 7 and 8. In one embodiment, the measuring disc is 5 inches in diameter; the disc and the arms P1 and P2 may be larger and/or longer for increased accuracy as needed. FIG. 14 illustrates a close up view of an example measuring disc.

FIG. 2B shows one embodiment of arm P2, which comprises a second pointer body 26, generally of the same length and composition as arm P1. For example, arm P2 may also be about 10 inches in length from opening 18b to opposing end 25. As with arm P1, an inset 24 may also be provided at the opposing end 25.

Arm P2 comprises a scale reader window 20. This window is positioned at or near an end of the pointer body 26 opposite the opposing end 25 and inset 24. The scale reader window 20 permits a user to read the scale therethrough (typically the first scale 14) when arm P2 is sighted on right adjacent pole 200 and arm P1 already sighted on pole 100 (described in greater detail below). This permits the user to obtain directional bearings, without the need to record or calculate any measurements, to mark the guy anchor point, after arm G3 is set as described below.

FIG. 2C illustrates one embodiment of guy arm G3. This arm is typically about 10 inches in length from an end 31 to opening 18c, and a total width (prior to flanging; see guy arm base plate 34) of about 3-4 inches; however, any suitable length and width may be contemplated. In one embodiment, the three arms (P1, P2 and G3) share a common pivot point fastener serving also to hold these three components together, and whose tension also creates a frictional force to maintain the angular relationship between the three arms once sighting is complete.

Ideally, guy arm G3 is designed to permit rotatable attachment with arms P1 and P2; this may be achieved by lining up opening 18c with a corresponding opening through measuring disc centre hole 18a on arm P1 and centre hole 18b on arm P2, and providing a fixing means, such as with a retainer nut and bolt (see nut 40 in FIG. 5) or the like, along a common pivot axis extending through the aligned openings 18a, 18b and 18c to create a rotation point. In one embodiment, the fixing means can be pointed at its top end to provide a targeting means to facilitate sighting of the adjacent poles for arms P1 and P2, similar to a "peep sight" commonly used on some devices being aimed toward certain objects. This pin may share a common centre line with the laser source, which can assist with achieving a proper bearing produced by the laser beam. Preferably, the retainer nut provides a friction-producing clamping action at the rotation point to prevent undesirable movement of the arms while in use.

Figures 3A, 3B, 3C:
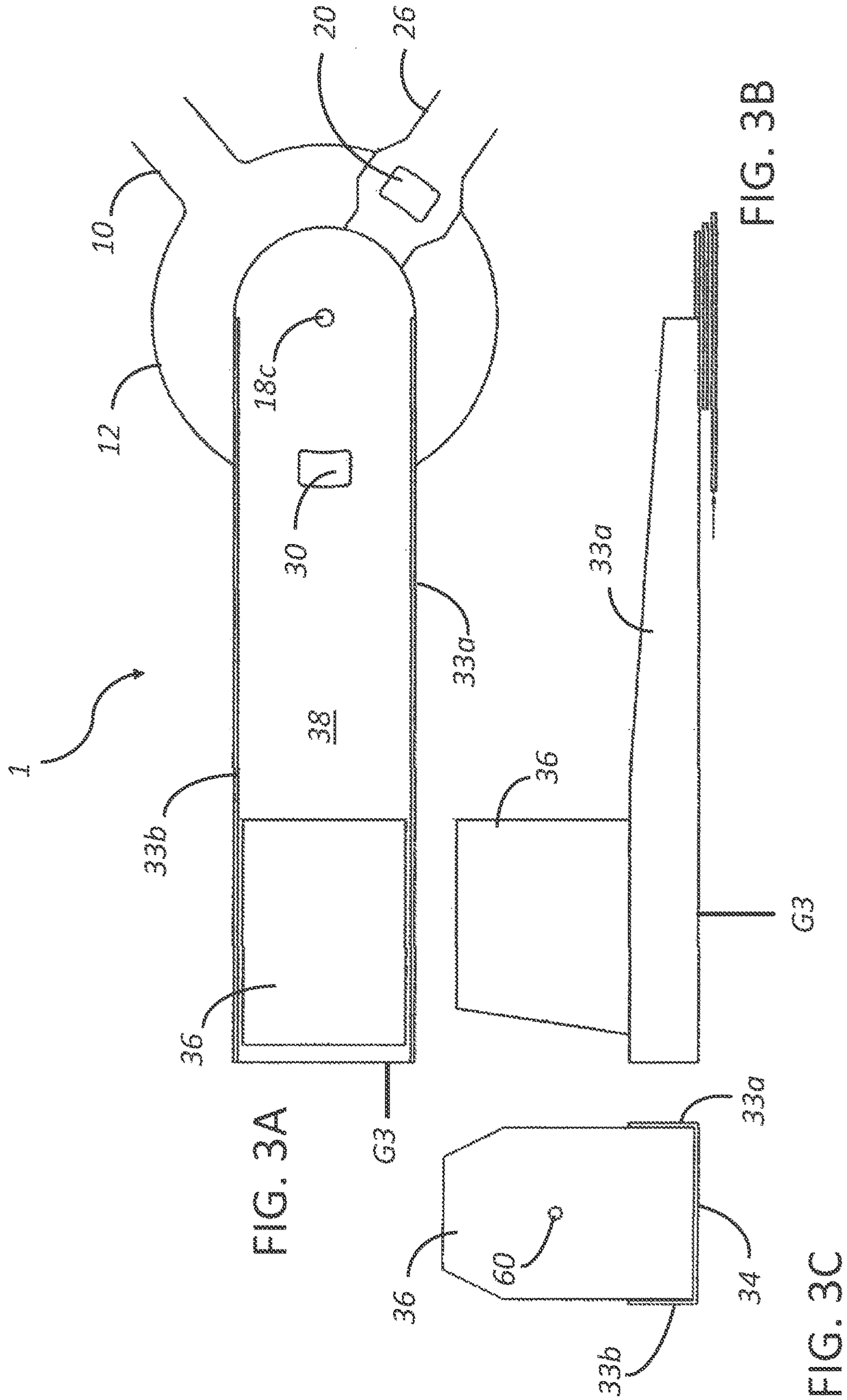
FIG. 3A shows a top view.
FIG. 3B shows a side view.
FIG. 3C shows a rear view.
Figure 4:
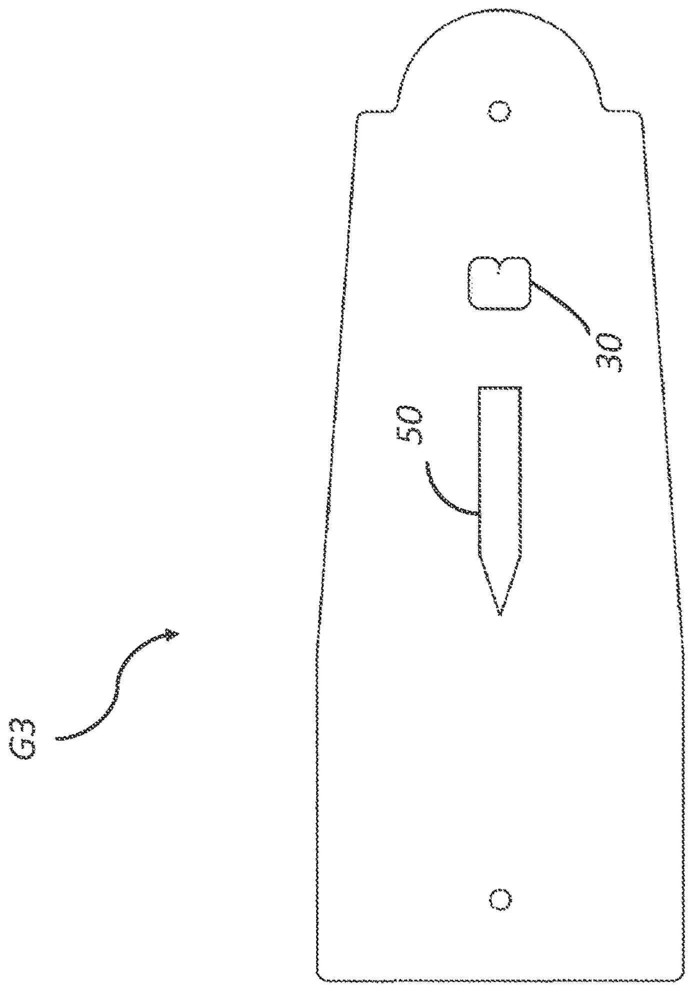
FIG. 4 shows one embodiment of the guy arm in isolation, prior to flanging.
Figure 5:
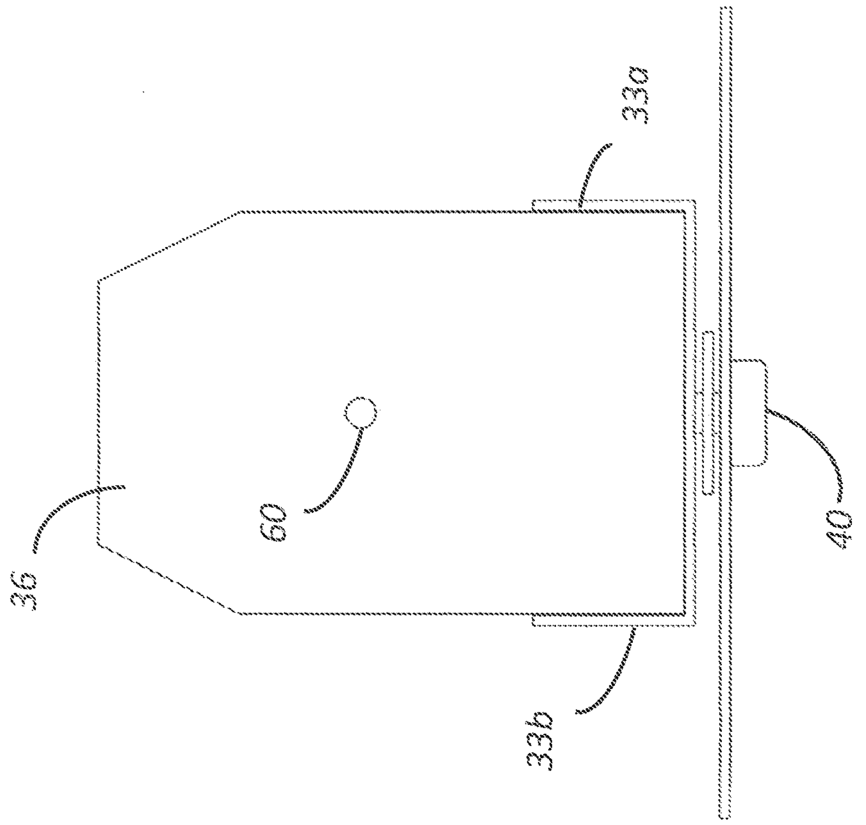
FIG. 5 shows a rear view of one embodiment of the anchor point locating device.
Figure 6:
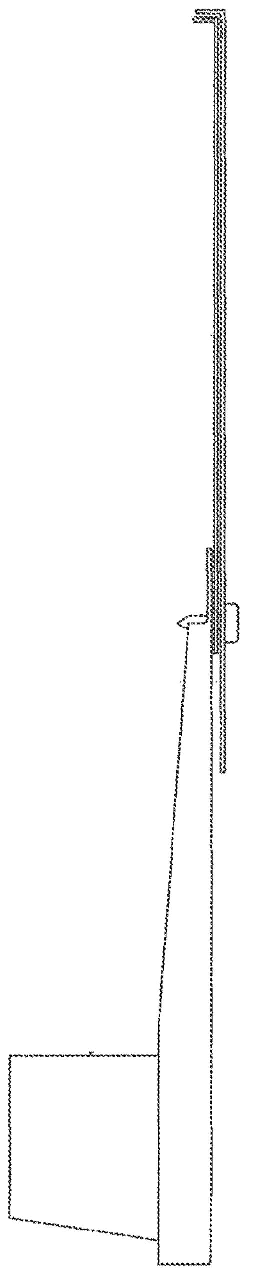
FIG. 6 shows a side view of one embodiment of the anchor point locating device, with the arms P1 and P2 in an extended position showing 90 degree end-sighting V-notches.

In FIG. 2C and FIG. 4, guy arm G3 is shown prefabrication, prior to having the tapered sides 32a, 32b flanged upward, as shown in FIGS. 3C, 5 and 6.

The device is typically set up on a supporting member, a non-limiting example being a tripod, such as a standard camera tripod or the like. The tripod is set up at the position of interest, which can be in close proximity to the middle utility pole, or at a surveyor's mark where the utility pole is intended to be erected (or at a location in immediate proximity thereto). Preferably, the tripod should allow for ready attachment of the device thereto for convenient set-up and disassembly, preferably by hand with few or no tools required.

In one embodiment shown in FIGS. 3A-3C, a focused light source such as a laser source 36 is mounted on guy arm G3 of device 1. The guy arm G3 may comprise a channel section 38 formed when the sides of the guy arm are flanged roughly 90 degrees upward, thus forming side members 33a, 33b of the guy arm. This provides a convenient and sufficiently rigid means to hold and retain the laser device such that it can ideally be used by only one person in the field due to the laser light target that is generated, thus allowing the instrument operator to leave his post and mark the targeted location for the guy anchor.

The light from the laser source typically has a vertical component, either alone or as part of a cross-hair pattern. The laser can be projected such that the vertical laser light component intersects with the ground, such that the technician can see the bearing of the guy arm away from the device on the ground. When using a vertical laser or cross-hair having a vertical component, a beam of light from that light source should intersect with the ground directly (thus forming a generally horizontal line of the laser light along the surface of the ground in the direction away from the laser source) and/or intersect with a vertical surface in the directional bearings determined by the device. In any suitable way, a vertical beam of light thus intersects with the ground using the observed bearings from the device. Thus, the use of a vertical surface is ideal but may not be necessarily required when the beam of laser light projecting from the device can already be readily visualized on the ground away from the device.

Figure 10:
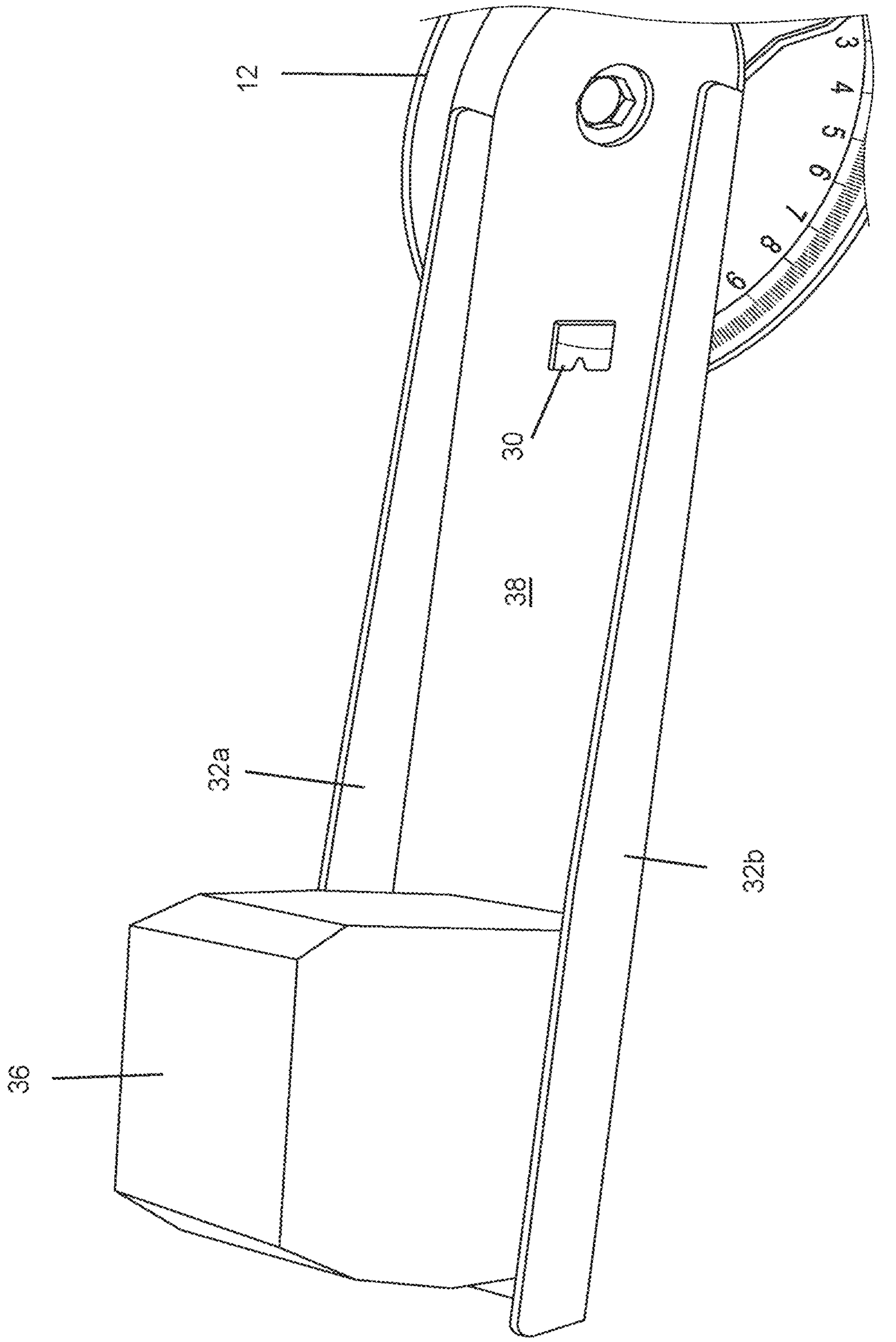
FIG. 10 shows an embodiment of a laser light source on an arm of the device.
Figure 11:
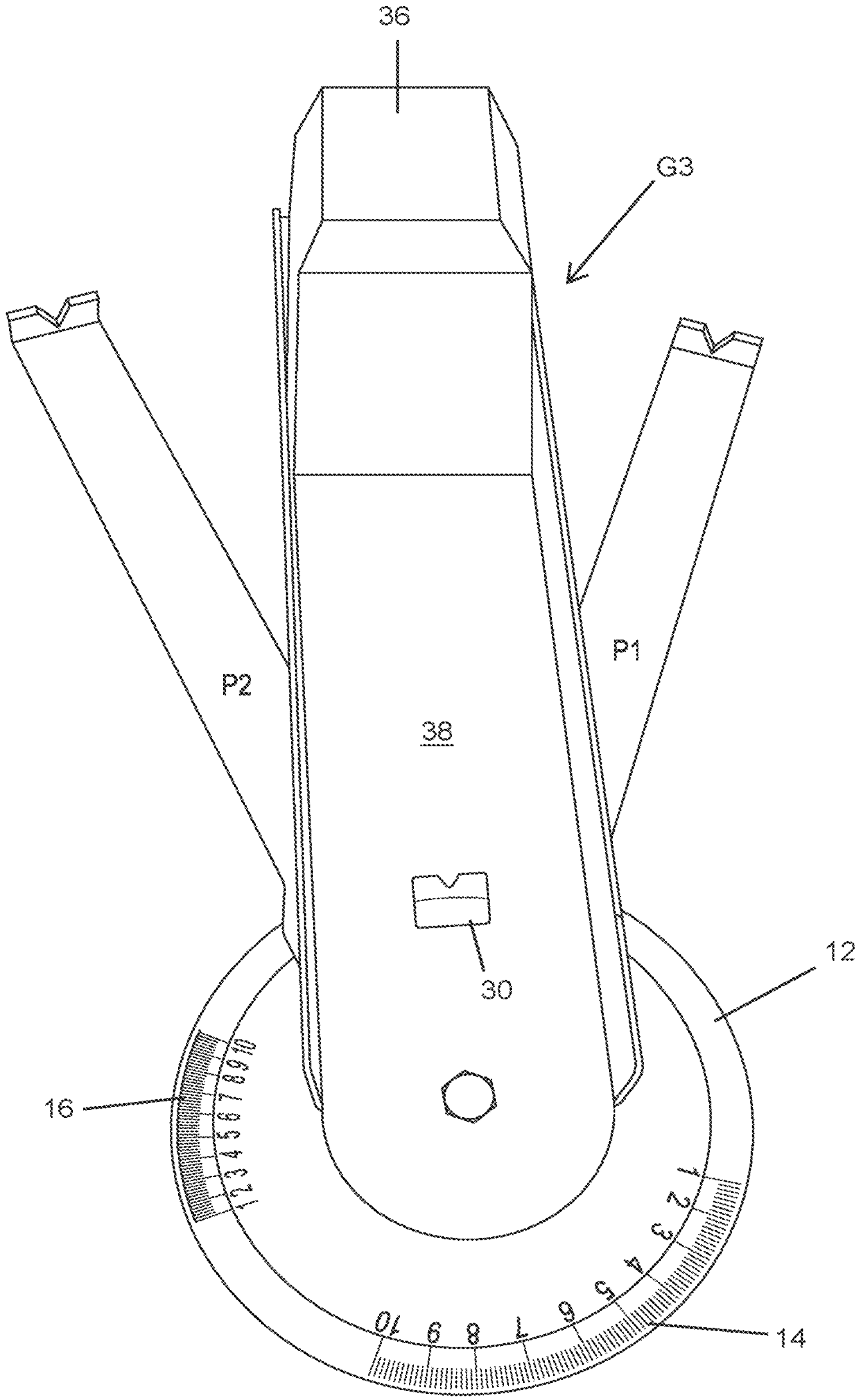
FIG. 11 shows an embodiment of the device with the arms contracted.
Figure 12:
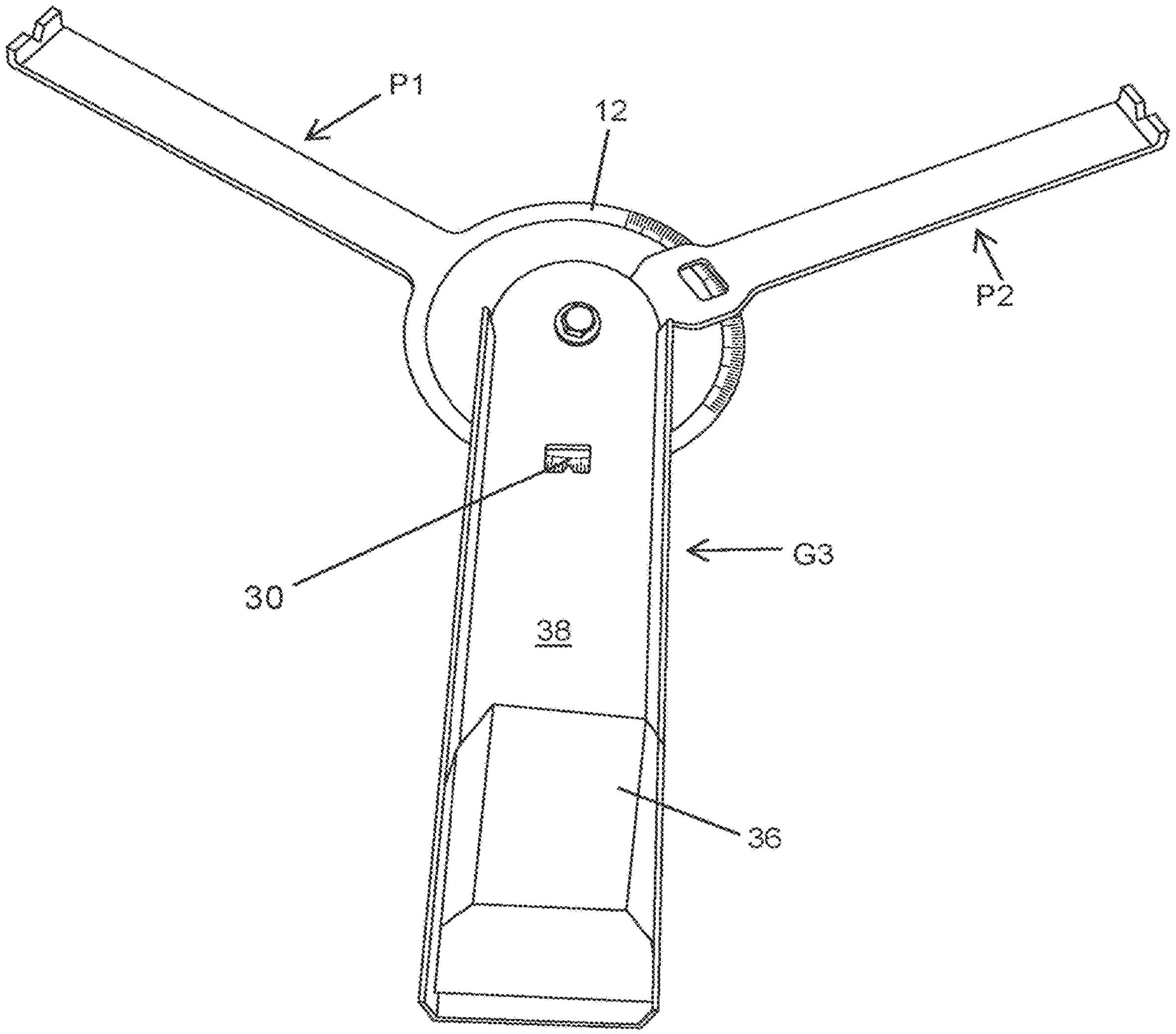
FIG. 12 shows a different view of the device as shown in FIG. 9.
Figure 13A:
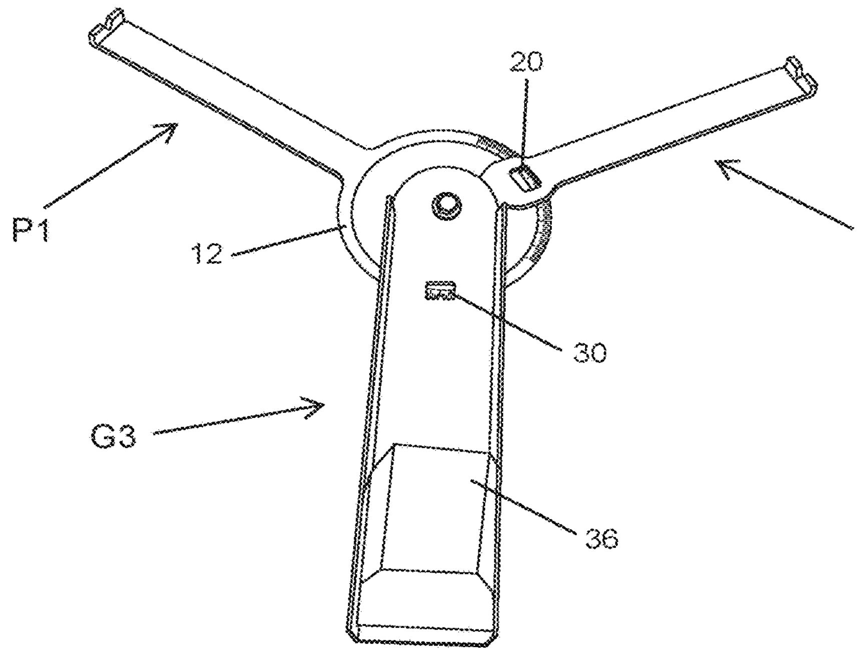
FIGS. 13A and 13B show different views of the device as shown in FIGS. 9 and 12.
Figure 13B:
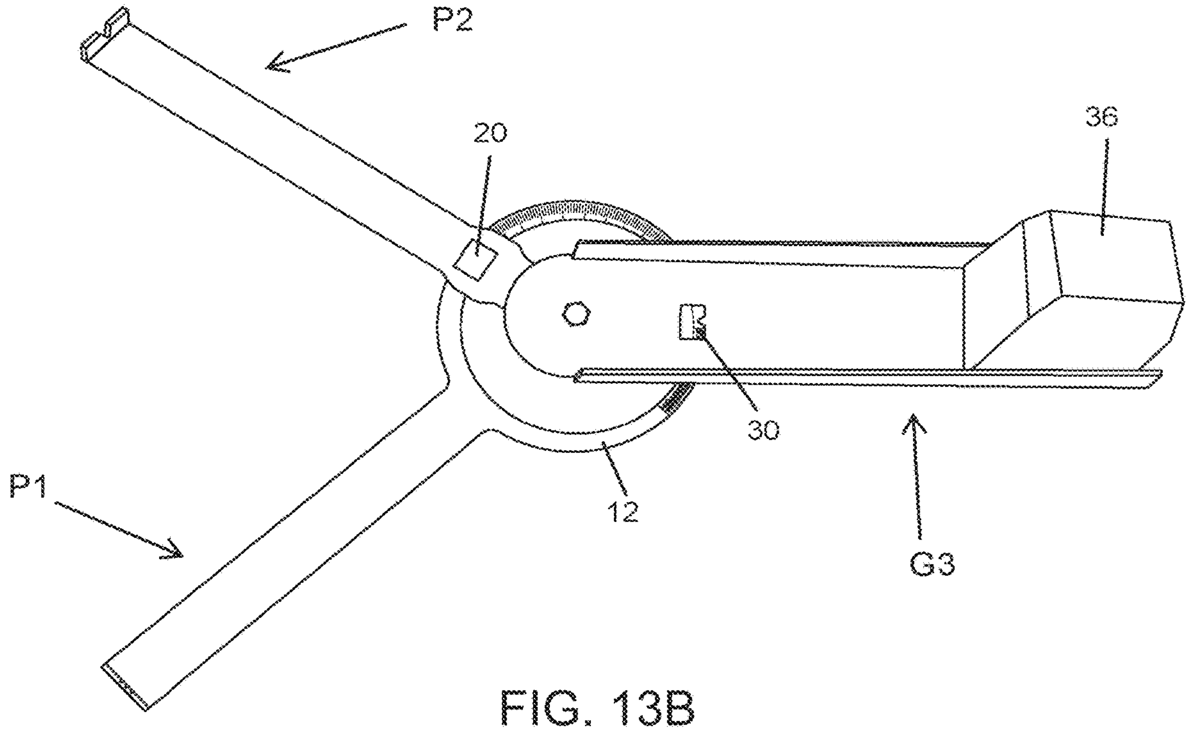

The distance from the device for placement of the guy anchor can be pre-determined, such as specified in a line engineering instruction or in consideration of other factors, such as the local terrain or any obstacles in the immediate area. The device, however, provides the bearing in the ideal direction from the device for assisting the technician, regardless of the pre-determined distance. FIG. 3A shows a top view, FIG. 3B shows a side view, and FIG. 3C shows a back view, of the device. FIG. 10 also shows an image of a laser light source on arm G3 of the device.

FIG. 4 shows one embodiment of the guy arm G3 prior to flanging. A guide arrow 50 may be provided (e.g. etched) on a top-facing surface of the guy arm to aid in directional locating.

FIG. 5 shows a rear view of the measuring device with a laser guide device mounted on guy arm G3 with exit port 60 for the laser beam. FIG. 6 is a side view of the device shown in FIG. 5.

Figure 16:
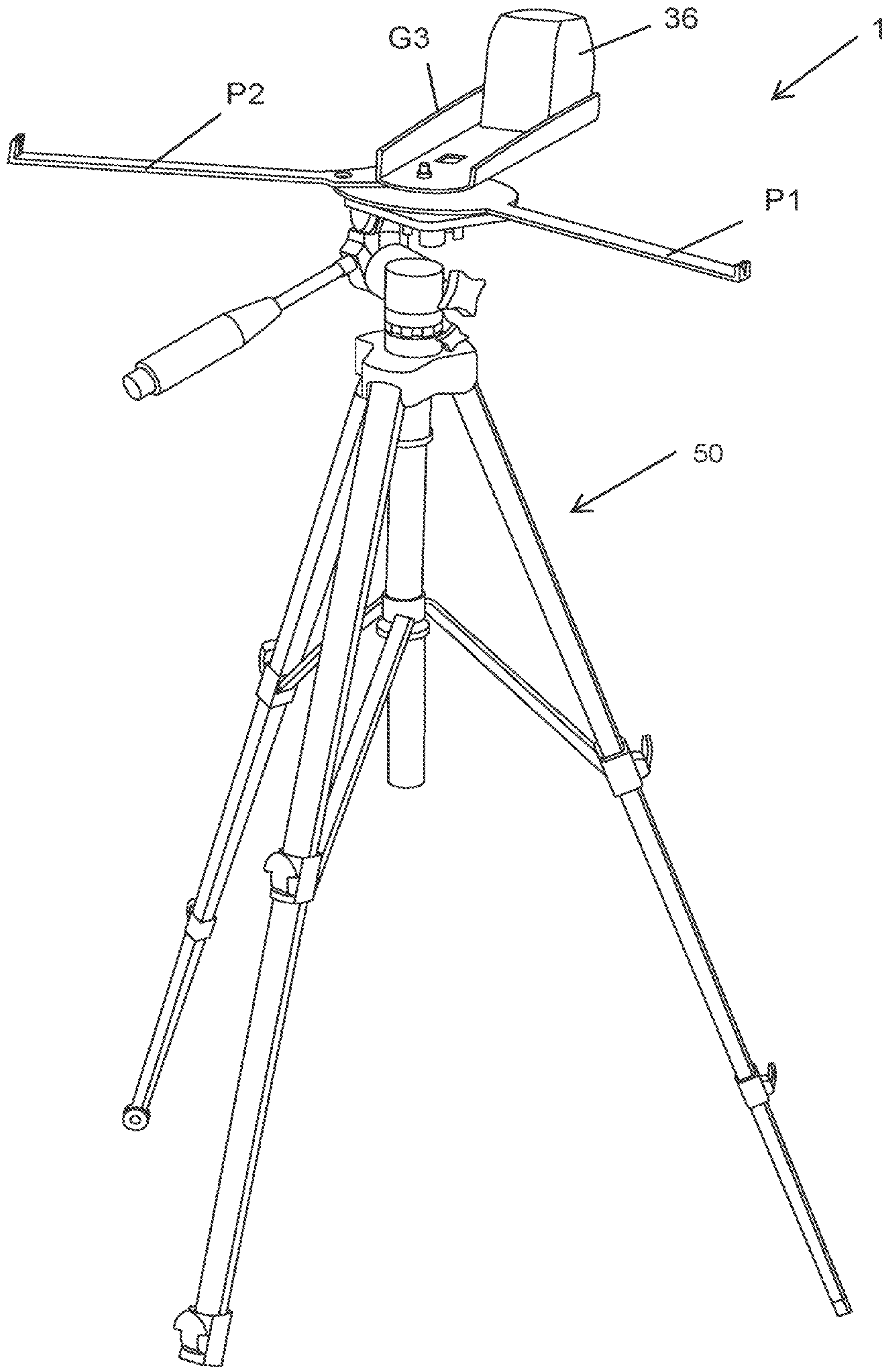
FIG. 16 shows an embodiment of the present device supported on a tripod.
Figure 17:
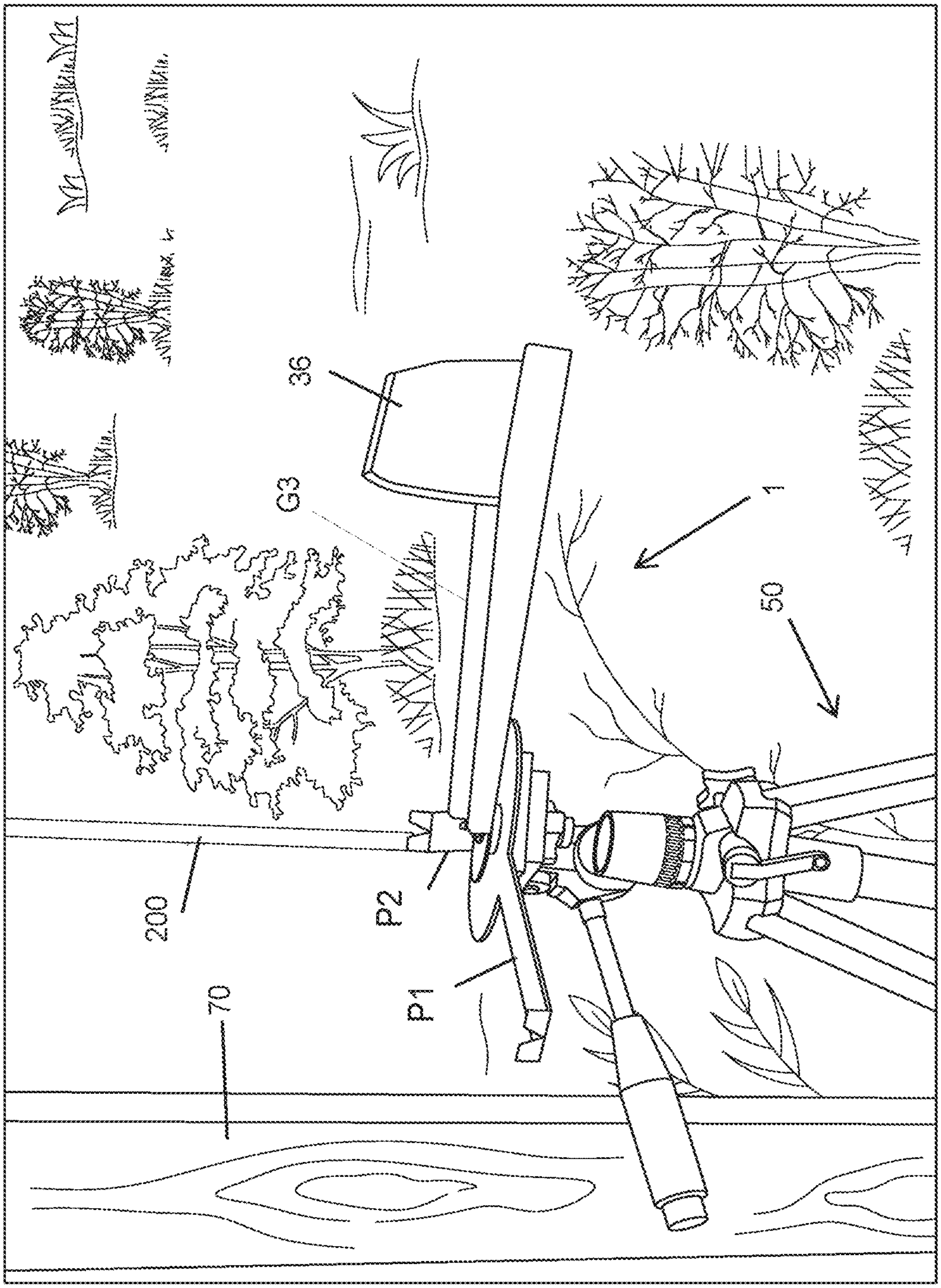
FIG. 17 shows an embodiment of the device in the field, set up on a tripod and adjacent to the utility pole to be guyed.
Figure 18:
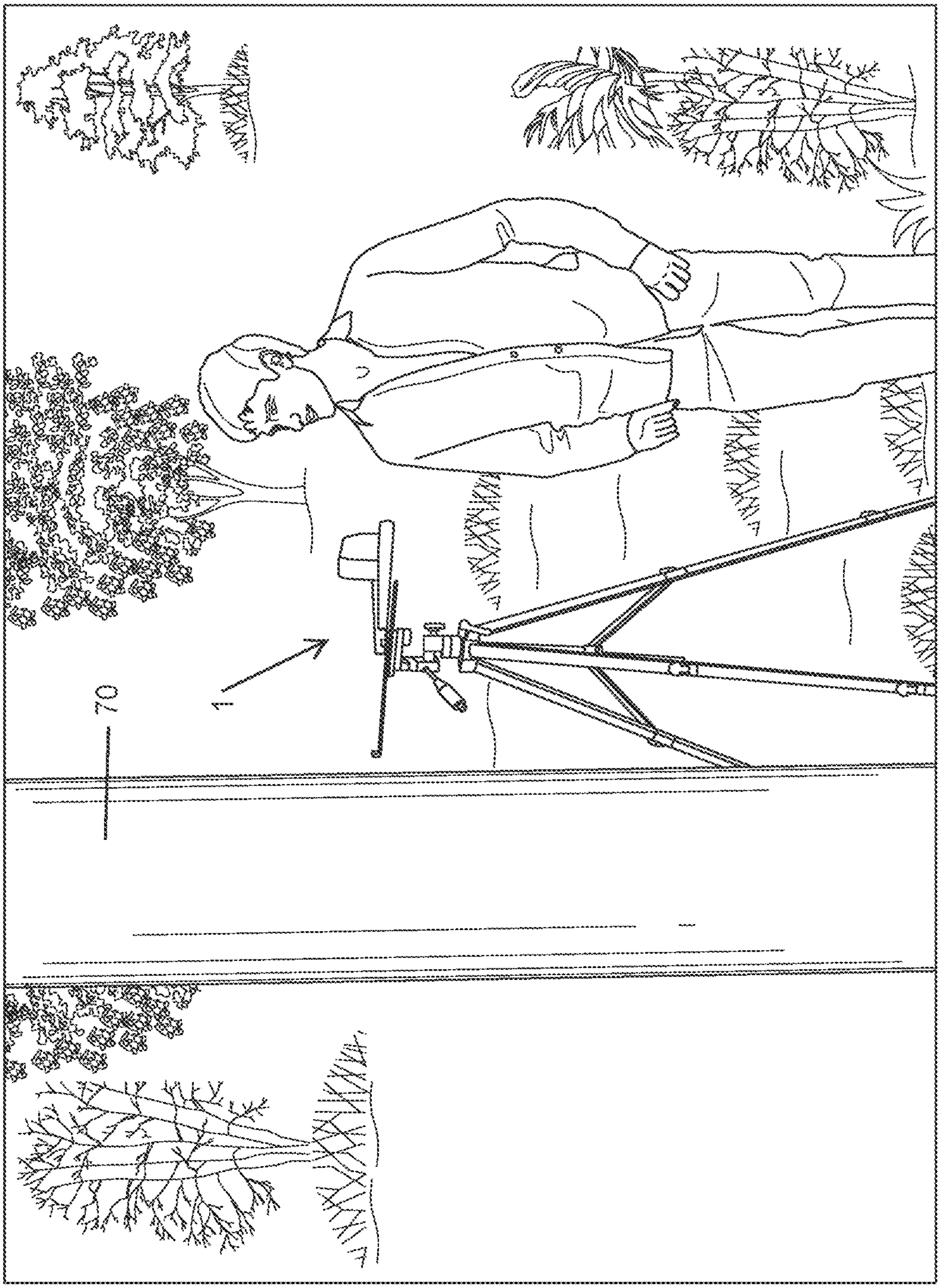
FIG. 18 shows a representation of the device in the field, with a user in the process of sighting adjacent poles to align the P1 and P2 arms and position arm G3 with mounted laser source.
Figure 19:
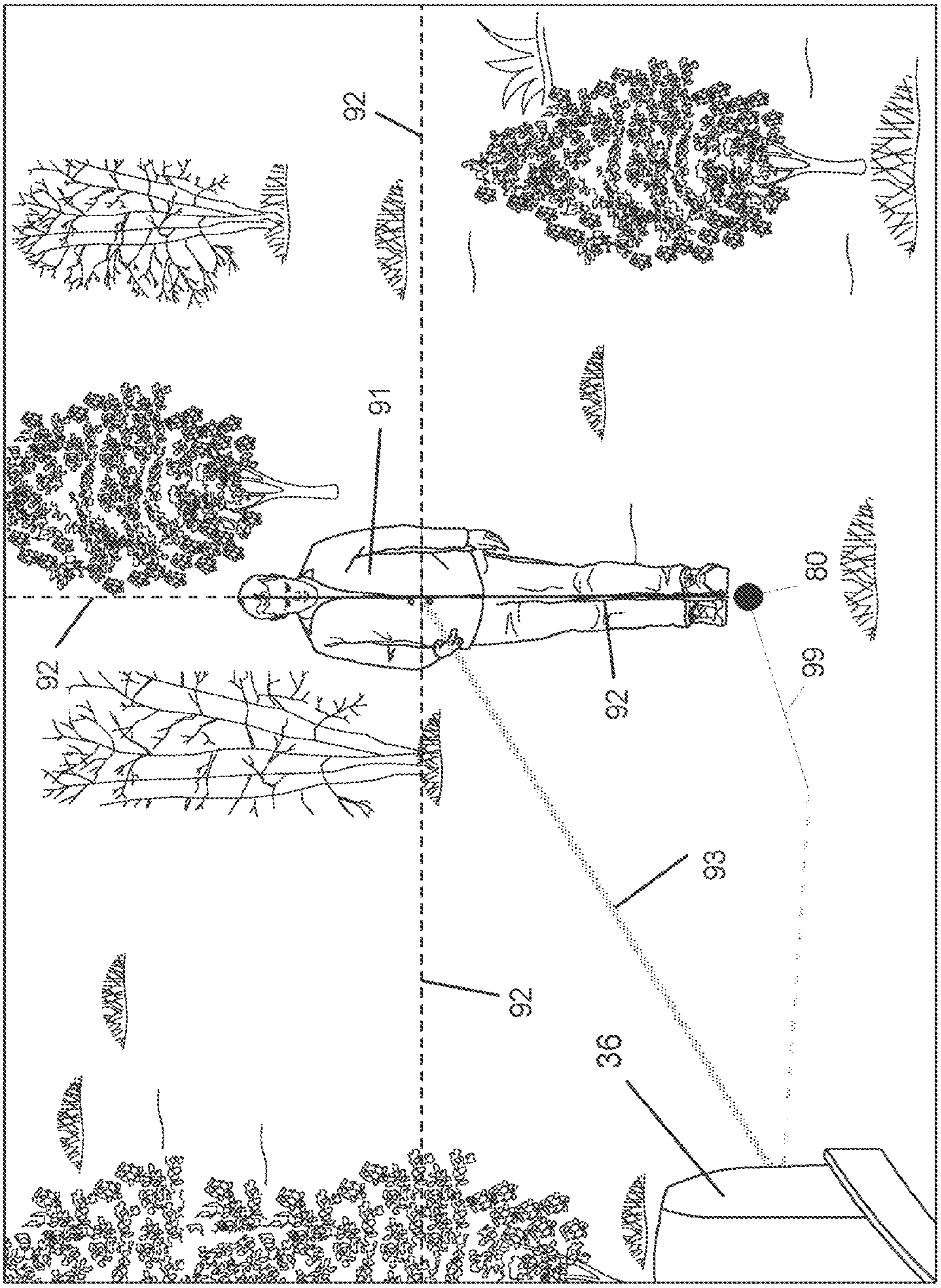
FIG. 19 shows an image of a user determining the locational position of the guy anchor based on the laser projection from the device.

FIGS. 7 and 8 show one example of the present device in use (overhead views). FIGS. 17-19 show images of the device in use in the field. Typically, an instrument operator (e.g. utility powerline technician) will be stationed at or near the middle pole 70 (such as a middle utility pole) between the left and right adjacent utility poles 100, 200 respectively, on the curved line. If the middle pole is already positioned, the device may be set on that pole, or in close proximity to the pole and offset only slightly toward outside of curve but enough to still allow sighting to the adjacent left and right pole locations (such as shown in FIG. 17). If the middle pole has not yet been installed, the device may be mounted on a camera-type tripod 50 (such as shown in FIG. 16), typically positioned at or near a surveyor's mark on the ground or other relevant indicator where the middle pole is to be located. In FIG. 17, arm P1 is sighted on a left hand pole (not shown); arm P2 is positioned to be sighted on right hand pole 200, and arm G3 can then be set on the scale number, so that the laser beam from laser source 36 can be projected in the proper bearing away from the device 1.

Sightings are taken on the two adjacent left and right poles (such as shown in FIG. 18 and generally shown in FIGS. 7 and 8). First, the user lines up arm P1 (for example, a left hand arm) toward left adjacent pole 100, such that the pole is sighted through the V-shaped inset at the end of arm P1. Then, with arm P1 in this position, the user rotates and points arm P2 (for example, a right hand arm) toward right adjacent pole 200, again through its respective V-shaped inset on P2, to sight the pole 200. By doing so, the user should see a number on first scale 14 appear through window 20. Typically, a measurement of 1 on the first scale is 90 degrees, while a measurement of 10 is 180 degrees, indicating the relative angle of arm P2 to the bearing of P1; the second scale 16 typically covers a range of 45 degrees.

Next, while keeping arms P1 and P2 in place, the user rotates guy arm G3 such that the number on the second scale 16, as viewed through window 30, matches the number identified above that was seen through window 20, to obtain the observed bearing. For example, if the number 3 on the first scale is visualized through the window 20, the user would then rotate guy arm G3 such that the number 3 on second scale 16 is visible through window 30. The user then turns on the laser source 36, thus projecting a laser light away from the device (i.e., in a direction outside the curved section) to a surface. The "surface", in this context, can be either the actual ground in the vicinity of the device, or can be a vertical surface onto which the laser light is projected; in either case, the laser light can be used to determine the bearing from the device in the direction of the proposed guy anchor location as described below, such that the laser or, more typically a vertical component thereof, intersects with the ground.

At a pre-determined distance 90 away from the surveyor's mark or middle pole in the direction shown in FIG. 8, a technician is prepared to place the guy anchor. The direction of the laser from arm G3 determines the bearing. For most applications, the guy anchor location can readily be determined on the ground surface projection of the vertical component plane directly on the ground. The technician then positions the guy anchor at both the correct bearing (from the laser) and the correct pre-determined distance from the device or middle pole.

In another embodiment, the technician may set up a target surface (such as shown in FIG. 19) based on the bearing determined by arm G3. With a laser light 93 that is a vertical or cross-hair pattern 92, the surface can be as simple as a piece of paper or other flat surface—or even the user's own torso 91—such that the laser light vertical component is projected thereon. However, it can be understood that a vertical surface may not be required if the vertical laser beam or cross-hair can be readily seen directly on the ground surface, thereby passing horizontally against the ground in the direction of the laser light from the device (a light portion 99 of which may also project and be visible along the ground back towards the device). The technician then notes the vertical axis light component of the light source and, where the light hits the ground, the user places a mark, signifying the location 80 for the guy anchor at the pre-determined distance from the device or middle pole.

Thus, the device projects laser light in the desired directional bearing based on the sightings from arms P1 and P2 and coordinated with arm G3; indeed, while the distance 90 from the light source where the guy anchor is to be positioned may be pre-determined, the actual location for placement of the guy anchor location 80 is the sighted directional position at that pre-determined distance. The guy wire can then be placed on the guy anchor outside the arc and attached to the pole requiring tension support.

In summary, the device and method of use provide a major simplification of the utility line technician's job in the field. The steps include:

1) set up the device at or near the middle pole in question;
2) sight the first (left) pole using arm P1;
3) sight the second (right) pole using arm P2;
4) set arm G3 on scale number and turn on laser target beam to generate a laser line; and
5) mark the ground at a specified distance from the device/middle pole on the laser line.

Ideally, the present device (with tripod) may be left assembled for storage and/or transit, such as by collapsing tripod legs and minimizing protrusion of P1, P2, G3 arms. Ideally, the assembly/disassembly can be done manually, preferably with no tools required.

The following are exemplary embodiments.

EMBODIMENTS

Embodiment 1. A utility pole guy wire anchor point locating device comprising:

a first arm for sighting the bearing of a first utility pole and having a first bearing scale and a second bearing scale;

a second arm for sighting the bearing of a second utility pole, the second arm rotatably connected to the first arm about a pivot;

a third arm rotatably connected to the first and second arms about the pivot, and having a light source thereon for projecting a light from the light source away from the device onto a surface outside a generally curved section of a utility pole transmission line between the first and second utility poles, the light being directed based on the bearings determined by locating the first and second utility poles on the first and second bearing scales, and the anchor point being determined based on a projection of the light on the surface.

Embodiment 2. The device of Embodiment 1, wherein the first utility pole is a left hand (LH) utility pole, and the second utility pole is a right hand (RH) utility pole, relative to the position of the device on the generally curved section of the utility pole transmission line.

Embodiment 3. The device of Embodiment 1 or 2, wherein the light source is a focused light source, such as a laser or the like.

Embodiment 4. The device of Embodiment 3, where the laser light from the light source comprises a vertical laser light component, such as a cross-hair having a vertical component, such that the vertical laser light component can intersect with the ground when the vertical component of the light source is projected on a surface, such as on a vertical surface or on the ground.

Embodiment 5: The device of Embodiment 3, wherein the surface is the ground and the vertical laser light component intersects with the ground, and wherein the anchor point is determined where the vertical laser light intersects with the ground at a pre-determined distance away from the device or from a middle pole which the device is placed on or adjacent to, outside the generally curved section of the utility pole transmission line, the middle pole being generally located between the first and second utility poles on the generally curved section.

Embodiment 6: The device of Embodiment 4, wherein the vertical surface is a panel, board, paper or human torso, for example.

Embodiment 7: A method of determining an anchor point for a utility pole guy wire anchor using the device of any of Embodiments 1 to 6, the method comprising:

placing the device at a location of a surveyor's mark, or on or adjacent to a middle utility pole, on a generally curved section of a utility pole transmission line at a location generally between the first and second utility poles to be sighted;

aiming the first arm in the direction of the first, or left hand (LH) utility pole;

aiming the second arm in the direction of the second, or right hand (RH) utility pole, whereby a bearing of the second utility pole is determined on the first bearing scale;

positioning the third arm such that the bearing on the second bearing scale matches the bearing on the first bearing scale;

projecting the light source away from the device and towards a surface outside the generally curved section based on the observed bearing of the third arm comprising the light source, wherein the anchor point is determined based on a projection of light from the light source onto the surface.

Embodiment 8: The method of Embodiment 7, wherein the light source is a laser, and the light is a laser light.

Embodiment 9: The method of Embodiment 8, wherein the surface is the ground and the laser projects a vertical light which intersects with the ground, and wherein the anchor point is determined where the vertical laser light intersects with the ground at a pre-determined distance from the device outside the generally curved section of the utility pole transmission line; said pre-determined location may be specified in a line engineering instruction.

Embodiment 10: The method of any of Embodiments 7 to 9, wherein the light source projects a vertical light (or vertical light component of a cross-hair laser) towards a generally flat vertical surface such that the vertical light intersects with the ground outside the generally curved section of the utility pole transmission line, allowing a user to identify a location on the ground, thus determining the point for placement of the guy wire anchor.

The above disclosure and figures are intended to be illustrative and not exhaustive. The description will suggest many variations and alternatives to one of ordinary skill in the art. Those familiar with the art may recognize other equivalents to the specific embodiments described herein within, without departing from the spirit and scope thereof.

What is claimed is:

1. A utility pole guy wire anchor point locating device comprising:

a first arm for sighting the bearing of a first utility pole and having a first bearing scale and a second bearing scale;

a second arm for sighting the bearing of a second utility pole, the second arm rotatably connected to the first arm about a pivot; and a third arm rotatably connected to the first and second arms about the pivot, and having a light source thereon for projecting a light away from the device onto a surface outside a generally curved section of a utility pole transmission line from the device at a location on said generally curved section between the first and second utility poles, the light being directed in a bearing of the third arm determined with the first and second bearing scales by locating the first and second utility poles using the first and second arms, and the anchor point being determined based on a projection of the light on the surface.

2. The device of claim 1, wherein the light source is a focused light source.

3. The device of claim 2, wherein the focused light source is a laser, and the light is a laser light.

4. The device of claim 3, wherein the laser comprises a vertical laser light component.

5. The device of claim 4, wherein the surface is the ground and the vertical laser light intersects with the ground, and wherein the anchor point is determined where the vertical laser light intersects with the ground at a pre-determined distance outside the generally curved section of the utility pole transmission line, wherein said pre-determined distance is a distance away from the device or from a middle pole which the device is placed on or adjacent to, the middle pole being located at said location on the generally curved section between the first and second utility poles.

6. The device of claim 4, wherein the surface is a vertical surface and the vertical laser light is projected onto the vertical surface and wherein the anchor point is determined where the projected vertical laser light intersects with the ground at a pre-determined distance outside the generally curved section of the utility pole transmission line, wherein said pre-determined distance is a distance away from the device or from a middle pole which the device is placed on or adjacent to, the middle pole being located at said location on the generally curved section between the first and second utility poles.

7. The device of claim 6, wherein the vertical surface is a panel, board, paper or a human torso.

8. The device of claim 1, wherein the first utility pole is a left hand (LH) utility pole generally located left of the device, and the second utility pole is a right hand (RH) utility pole generally located on the right of the device.

9. A method of determining an anchor point at a ground location for a utility pole guy wire anchor using the device of claim 1, the method comprising:

placing the device at a location of a surveyor's mark, or on or adjacent to a middle utility pole, positioned on a generally curved section of a utility pole transmission line between the first and second utility poles to be sighted;

aiming the first arm in the direction of the first utility pole;

aiming the second arm in the direction of the second utility pole, whereby a bearing of the second utility pole is observed on the first bearing scale;

positioning the third arm such that the bearing on the second bearing scale matches the bearing on the first bearing scale to obtain a third arm observed bearing;

projecting the light from the light source away from the device and towards a surface outside the generally curved section based on the observed bearings of the third arm comprising the light source, wherein the anchor point is determined based on a projection of the light onto the surface.

10. The method of claim 9, wherein the light source is a focused light source.

11. The method of claim 10, wherein the focused light source is a laser, and the light is a laser light.

12. The method of claim 11, wherein the laser light comprises a vertical laser light component.

13. The method of claim 12, wherein the surface is the ground and the vertical laser light component intersects with the ground, and wherein the anchor point is determined where the vertical laser light component intersects with the ground at a pre-determined distance outside the generally curved section of the utility pole transmission line, wherein said pre-determined distance is a distance from the device or from the middle utility pole outside the generally curved section.

14. The method of claim 12, wherein the surface is a vertical surface and the vertical laser light component is projected onto the vertical surface and wherein the anchor point is determined where the projected vertical laser light component intersects with the ground at a pre-determined distance, wherein said pre-determined distance is a distance from the device or from the middle utility pole outside the generally curved section of the utility pole transmission line.

15. The method of claim 14, wherein the vertical surface is a generally flat vertical surface such that the vertical laser light component projects onto the vertical surface and thereby intersects with the ground to provide the anchor point for placement of the guy wire anchor at the pre-determined distance.

16. The method of claim 12, wherein the vertical laser light component is from a cross-hair laser such that the vertical laser light component of the cross-hair laser intersects with the surface and thus intersects with the ground, allowing the user to determine the anchor point for placement of the guy wire anchor at a pre-determined distance, wherein said pre-determined distance is a distance from the device or from the middle utility pole outside the generally curved section of the utility pole transmission line.

* * * * *